United States Patent [19]
Tarvin et al.

[11] Patent Number: 5,099,872
[45] Date of Patent: Mar. 31, 1992

[54] LAND-BASED SPILL COLLECTION SYSTEM

[76] Inventors: Cliff A. Tarvin, P.O. Box 553, Long Creek, Oreg. 97856; Steven H. Omann, P.O. Box 432, Halfway, Oreg. 97834

[21] Appl. No.: 737,557

[22] Filed: Jul. 26, 1991

Related U.S. Application Data

[63] Continuation of Ser. No. 664,512, Mar. 5, 1991, abandoned, which is a continuation of Ser. No. 523,157, May 14, 1990, abandoned.

[51] Int. Cl.$^5$ .................. B65B 3/11; B65B 39/02; F16K 51/00
[52] U.S. Cl. .................. 137/312; 141/114; 141/337; 220/573; 222/108; 296/38
[58] Field of Search .................. 137/312, 313; 141/86, 141/114, 282, 337; 220/571, 573; 222/108; 296/38; 184/1.5, 106

[56] References Cited

U.S. PATENT DOCUMENTS

| | | | |
|---|---|---|---|
| 3,389,559 | 6/1968 | Logan | 405/60 |
| 3,548,605 | 12/1970 | Paull et al. | 405/60 |
| 3,610,194 | 10/1971 | Siegel | 114/0.5 |
| 3,756,294 | 9/1973 | Rainey | 141/392 |
| 3,815,646 | 6/1974 | Coakley | 141/337 |
| 4,022,257 | 5/1977 | O'Connell | 184/106 |
| 4,054,184 | 10/1977 | Marcinko | 184/106 |
| 4,098,398 | 7/1978 | Meyers | 141/340 |
| 4,195,710 | 4/1980 | Garrison | 184/1.5 |
| 4,592,448 | 6/1986 | Morris | 184/1.5 |
| 4,756,349 | 7/1988 | Atkins | 141/114 |
| 4,936,418 | 6/1990 | Clausen | 184/106 |

Primary Examiner—George L. Walton
Attorney, Agent, or Firm—Welsh & Katz, Ltd.

[57] ABSTRACT

A funnel-like tapered containment vessel of flexible sheet material has its smaller end portion normally closed by a valve and its other end portion open to define a mouth. Such vessel has a large flat lip that can be positioned under the source of a leak of hazardous liquid such that the liquid falls on the lip and is conveyed into the vessel. The open end portion of the vessel has an inflatable cuff including a top arcuate part which, when inflated, holds the upper portion of the mouth of the vessel open. The cuff includes a separate bottom part extending around the margin of the lip and inflatable to form a raised rim to prevent runoff. The normally closed valved end portion of the vessel can be connected to a collapsible collection container such as by a hose having quick-connecting end fittings.

20 Claims, 3 Drawing Sheets

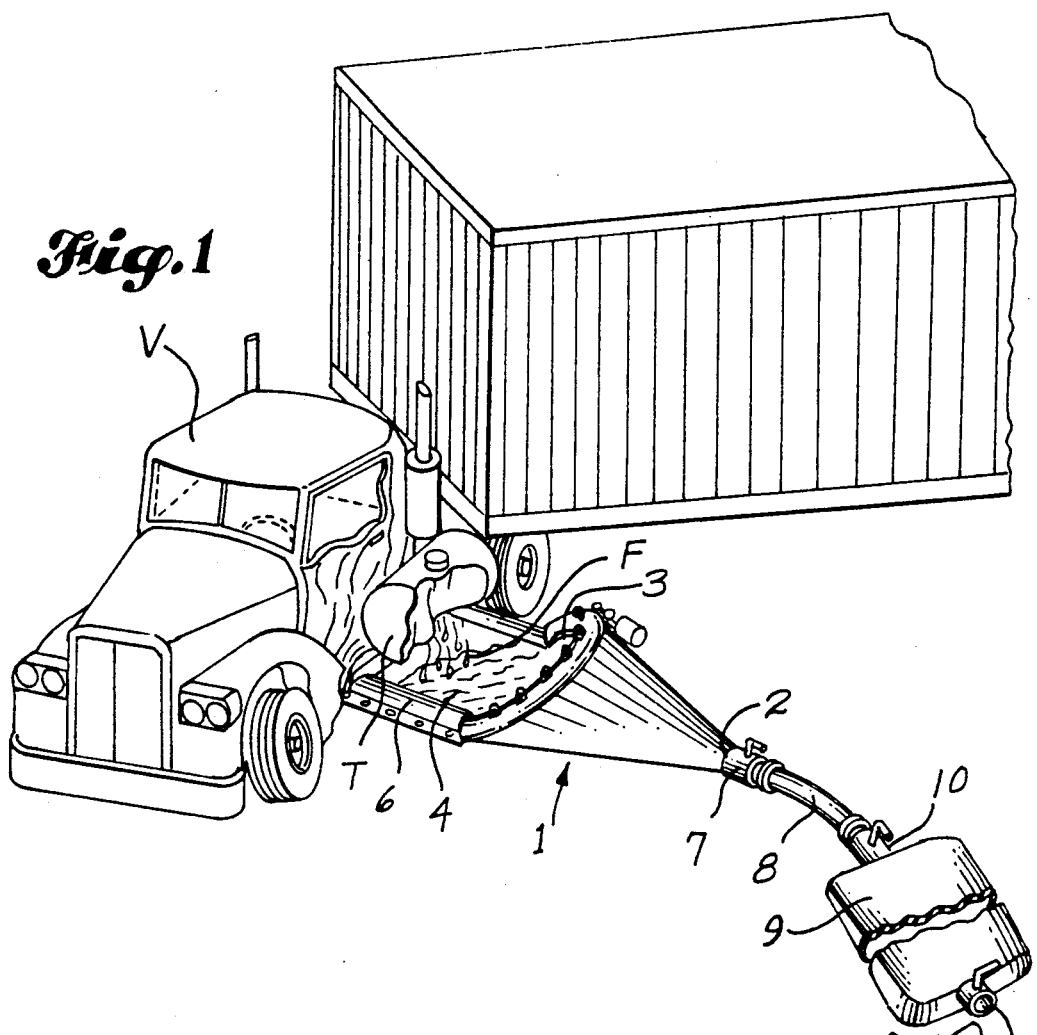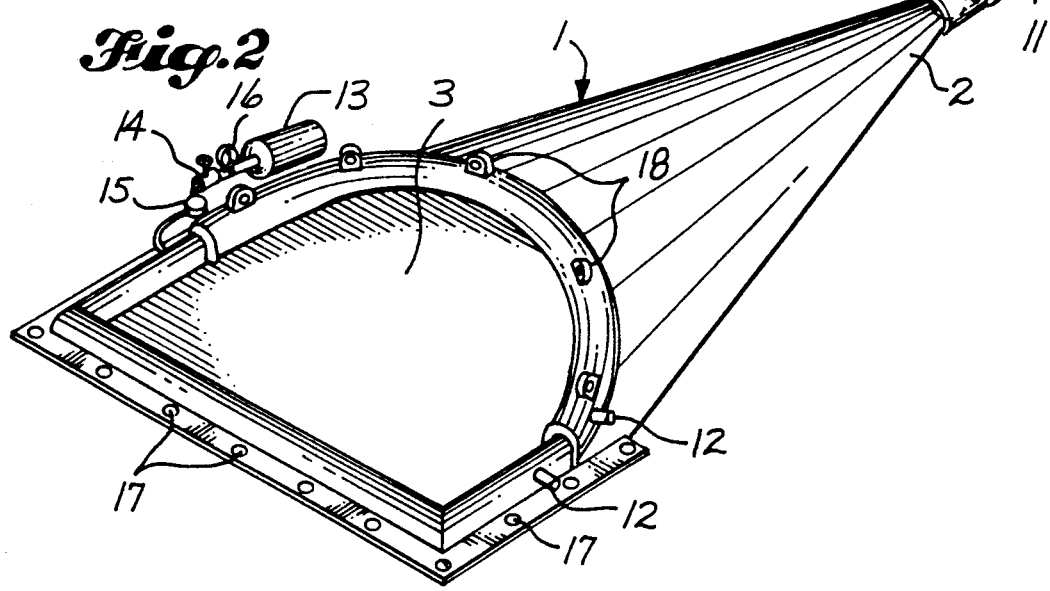

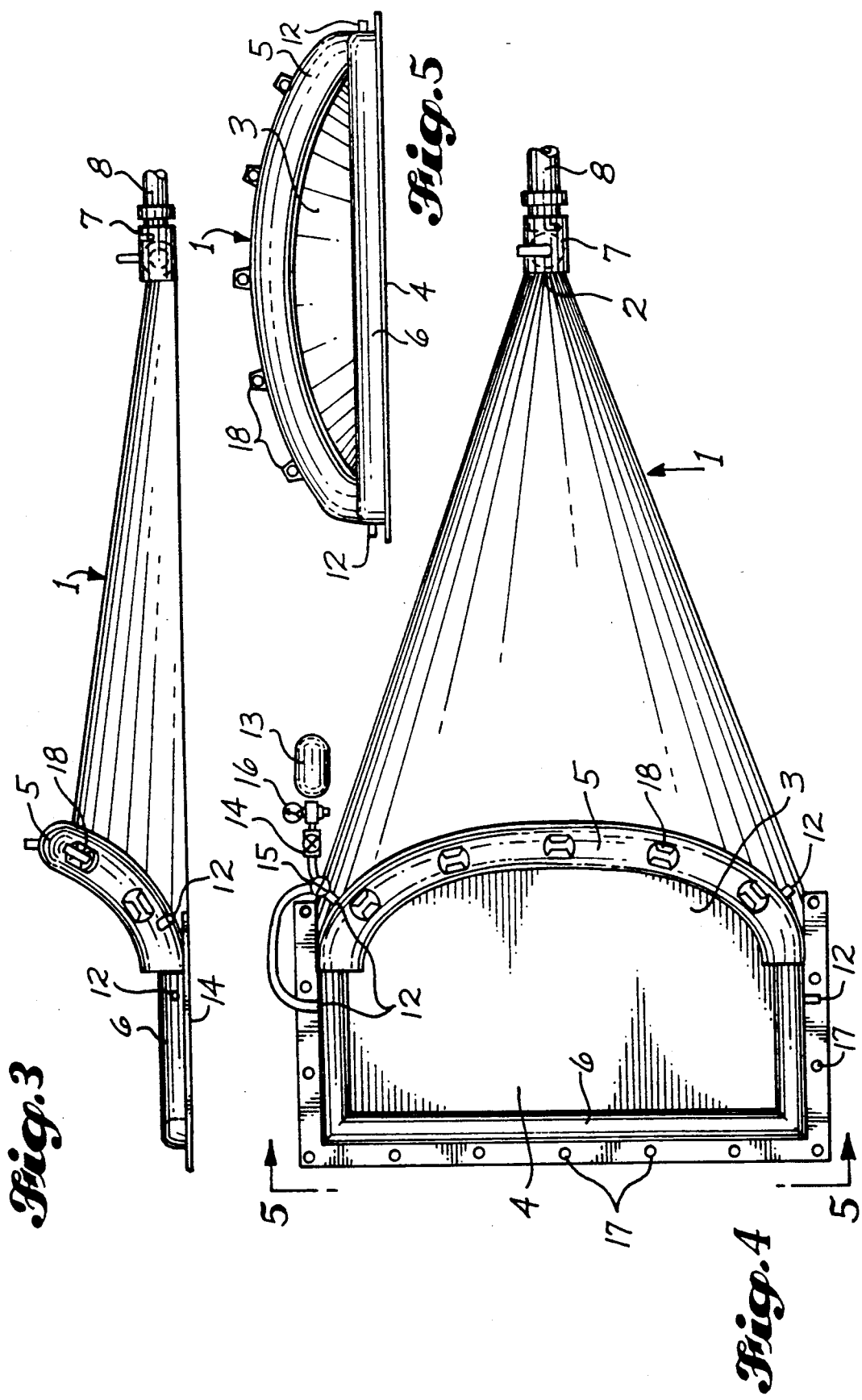

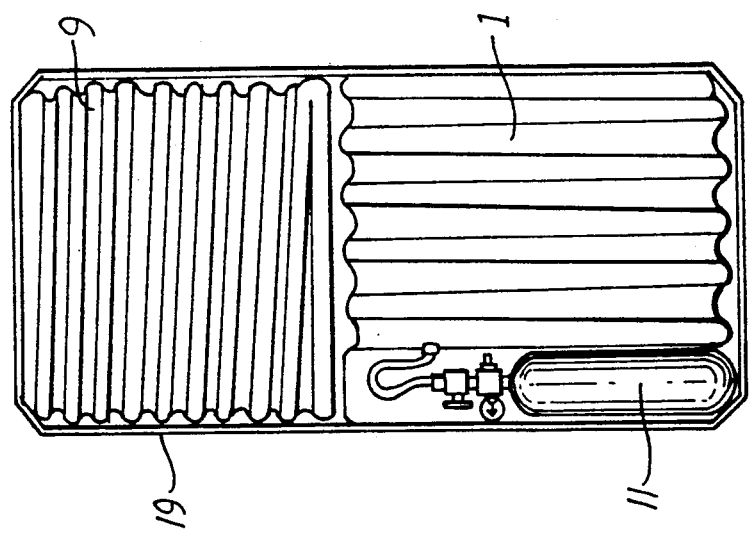
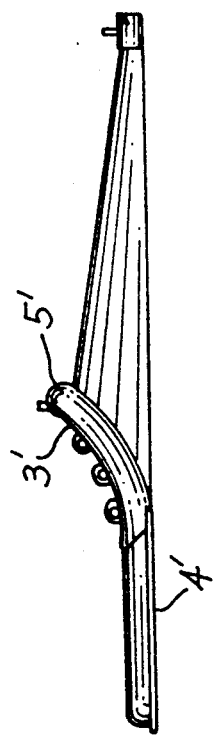
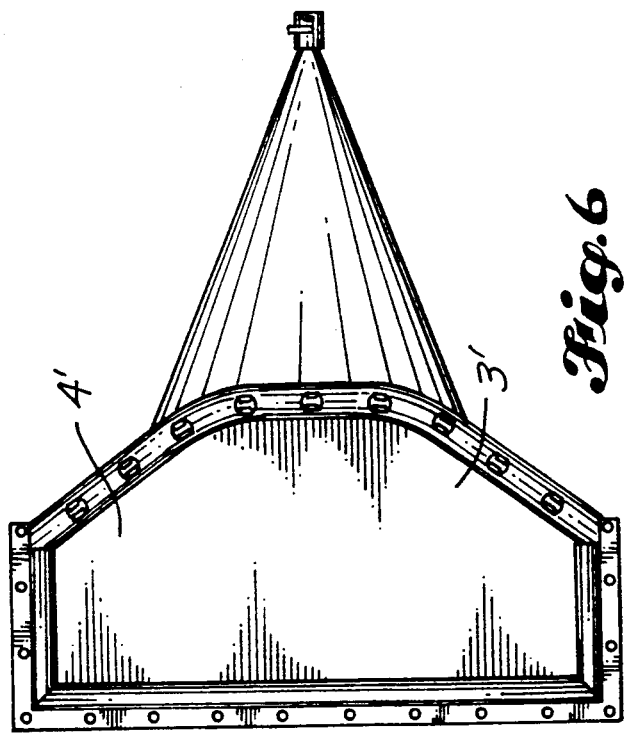

LAND-BASED SPILL COLLECTION SYSTEM

This is a continuation of co-pending application Ser. No. 07/664,512, filed on Mar. 5, 1991, now abandoned, which is a continuation of Ser. No. 07/523,157 filed on May 14, 1990, now abandoned.

BACKGROUND OF THE INVENTION

1. Field of the Invention

The present invention relates to equipment that can be deployed at a site where potentially dangerous or environmentally damaging or messy liquid is leaking from a land-based container to collect the liquid for safe disposal.

2. Prior Art

Considerable media exposure is given to spills of large amounts of environmentally damaging liquids, particularly oil spills at sea for which the environmental damage can be extensive and readily visible. Past efforts to provide systems for confining and recovering hazardous liquids at sea are illustrated by the devices disclosed in the following U.S. patents:

Logan U.S. Pat. No. 3,389,559, issued June 25, 1968;
Paull et al. U.S. Pat. No. 3,548,605, issued Dec. 22, 1970;
Siegel U.S. Pat. No. 3,610,194, issued Oct. 5, 1971;
Rainey U.S. Pat. No. 3,756,294, issued Sept. 4, 1973.

More often, however, smaller and less newsworthy spills occur on land. Such spills can also be environmentally damaging, potentially dangerous or at least inconvenient and messy to clean up. For example, land-based spills can be caused by accidents involving tanker transport vehicles resulting in leaks from ruptures of hazardous liquid containers or accidents or equipment failure at above ground storage tanks, pipelines or pumping stations. Access to the source of the leak can be difficult depending on the natural and man-made surroundings. There is no known prior system for quick and effective on-site containment and collection of hazardous liquids from different types of land-based spills.

SUMMARY OF THE INVENTION

The present invention provides portable equipment that can be deployed at the site of a land-based spill quickly and easily, even if access is limited or the surrounding terrain uneven, so as to confine and collect the spilled liquid for subsequent disposal.

In the preferred embodiment, the primary component of such equipment is a containment vessel of flexible sheet material open at one end and normally closed at the other. The vessel tapers in funnel-like fashion from its open end to its closed end and a valve is provided at the closed end for controlling discharge of liquid received in the vessel.

The open end of the vessel has a two-part inflatable cuff. An arcuate upper part of the cuff can be inflated to maintain the mouth of the vessel open adjacent to a large flat lip that can be positioned under the source of the leak. The second part of the cuff extends along the marginal portion of the lip and, when inflated, forms a raised rim to prevent runoff.

The lip and cuff of the vessel can have spaced tie-down fittings or eyelets so that the vessel can be secured in position such as by staking the lip to the ground and/or tying or strapping the upper portion of the cuff to the leaking container.

Preferably, the valved end of the containment vessel has a quick-connecting coupling for connection of a hose or conduit which can lead to one or more separate collapsible collection containers. Liquid from filled collection containers can be pumped to transport vehicles for disposal or the containers themselves can be shifted to transport vehicles for disposal.

After clean up, the cuff of the containment vessel can be deflated and the vessel and other components of the system folded or rolled to compact condition in which they can be stowed until needed at the site of another spill.

BRIEF DESCRIPTION OF THE DRAWINGS

FIG. 1 is a top perspective of a land-based spill collection system in accordance with the present invention deployed for containing and collecting fuel leaking from a vehicle tank damaged due to accident.

FIG. 2 is a top perspective of one component of such system, namely, the containment vessel; FIG. 3 is a side elevation of such component; FIG. 4 is a top plan of such component; and FIG. 5 is an end elevation of such component taken from line 5—5 of FIG. 4.

FIG. 6 is a top plan of an alternative form of containment vessel in accordance with the present invention; and FIG. 7 is a side elevation of the form of containment vessel shown in FIG. 6.

FIG. 8 is a diagrammatic interior view of a storage container containing components of a land-based spill collection system in accordance with the present invention rolled or folded to compact condition.

DETAILED DESCRIPTION

The land-based spill collection system in accordance with the present invention is effective to confine and collect liquids leaking from a wide variety of different types of containers for a wide variety of situations and in a wide variety of surroundings. Dangerous leaking liquids can result from tanker trailer or railroad tanker car rollover or less dramatic but more frequent causes such as highway accidents or equipment failure such as leaking hoses, conduits or valves. FIG. 1 illustrates a representative cause of leaking hazardous liquid, namely, fuel F leaking from the tank T of a vehicle V which tank was ruptured by contact with another vehicle or a stationary obstruction.

As illustrated in FIG. 1, components of the present invention include a containment vessel 1 having a normally closed end portion 2 and an open end portion or mouth 3. A large flat lip 4 extends from the mouth of the vessel and is positioned beneath the tank rupture. Vessel 1 has a two-part inflatable cuff 5, 6 to hold the central portion of lip 4 taut, to prevent runoff of fuel from the end and sides of the lip and to maintain the mouth 3 of the vessel 1 open to receive the leaking fuel. The normally closed end portion 2 of the vessel 1 has a standard valve 7 with a coupling connectible to a hose 8 leading to a storage container 9. Such storage container has a front coupling 10 connectible to the hose 8 and a rear coupling 11 which can be connected to another hose leading to another container or, if desired, directly to another container. Both the front coupling 10 and rear coupling 11 preferably are valved for changeover without spillage.

The containment vessel 1 is shown in greater detail in FIGS. 2 through 5. Preferably, the vessel is formed of impervious flexible sheet material such as an industrial coated fabric. Such fabric can be of the type sold under the trademark REEVECOTE or REEVETECH available from Reeves Brothers, Inc., of Spartanburg, S.C. The specific base fabric and elastomer coating can be selected for the desired strength, durability, flexibility, permeability and resistance to chemical degradation.

In the illustrated embodiment, the body of the vessel 1 tapers in diameter in funnel-like fashion from its open mouth 3 to the opposite end 2 which normally is closed by the standard ball valve 7. Valve 7 preferably is provided with a quick-coupling fitting for convenient connection of the hose 8. The quick coupling fitting can be identical to a standard fire hose end fitting. Preferably, the hose 8 also is formed of a suitable industrial coated fabric.

The open end 3 of the vessel has the two-part inflatable cuff. The top part 5 of such cuff encompasses about 180 degrees of the circumference of the vessel 1 and is of arcuate contour so that, when inflated, the cuff is substantially rigidified to the condition shown in the drawings in which the upper portion of the mouth of the vessel is held open. The large flat lip 4 of the vessel projects forward from the bottom of the mouth and has the horizontal bottom part 6 of the cuff. Such bottom part 6 is generally U-shaped and extends close to the marginal portion of the lip 4. In the inflated condition shown, the bottom part 6 of the cuff forms a raised rim or sidewall extending from the opposite ends of the generally upright cuff portion 5. The adjacent ends of the two cuff parts are secured together such as by suitable adhesive, but their interiors are not in communication. Rather, each cuff part has a single interior chamber isolated from the chamber of the other part.

Preferably, inflation nozzles 12 are provided at both sides. Inflation can be quickly accomplished by gas under pressure from a gas bottle 13 through a supply valve 14. A directional valve 15 can be provided to direct gas from the bottle into one or the other or both of the cuff parts 5 and 6. A regulator 16 can be provided to control the maximum pressure of gas supplied, such that a substantially constant pressure is maintained even if the cuff has a small leak.

Depending on the surroundings, it may or may not be required to inflate the bottom cuff part 6 along the margin of the lip 4. In almost every circumstance, however, the top cuff part 5 will be inflated so as to maintain the mouth of the vessel 1 open.

Preferably, tie-downs are provided around the circumference of the mouth of the vessel which can be in the form of eyelets 17 along the side and end edge portions of the lip 4 and cleats or other suitable fittings 18 along the top cuff part 5. Consequently, the mouth of the vessel 1 can be conveniently secured in position such as by staking the lip 4 to the ground or tying or strapping it in raised position to stakes, poles or the leaking receptacle itself. Similarly, before or after inflation, the top cuff part can be tied in position. In close quarters, inflation of the cuff 5, 6 can help to conform the mouth of the vessel to the leaking receptacle so that all leaking liquid will fall on the lip 4 and be conveyed into the vessel.

In the embodiment shown in FIG. 1, the width of the vessel 1 at its mouth 3 and, consequently, the width of the projecting lip 4 is about 6 feet which is sufficient for reliably confining a wide variety of leaks, particularly leaks from small ruptures or faulty valves, for example. For applications requiring a larger mouth, a vessel body of approximately the same size can be used but, as illustrated in FIGS. 6 and 7, the width of the mouth 3' and lip 4' can be increased. In the embodiment shown in FIGS. 6 and 7, the overall width of the mouth and lip are about 20 feet. Consequently, the shape of the top part 5' of the inflatable cuff is changed. Whereas in the previously described embodiment the top part of the cuff is approximately semicircular, in the embodiment shown in FIGS. 6 and 7 the top part 5' still is of generally arcuate configuration but its opposite end portions flare forward and outward to the opposite sides of the lip 4'. The embodiment shown in FIGS. 1 through 5 may be appropriate as standard equipment for trucks and emergency vehicles. The embodiment shown in FIGS. 6 and 7 would be appropriate as standard equipment for tanker trailers and railroad tanker cars.

For either embodiment, all components of the spill containment system in accordance with the present invention can be rolled or folded to compact condition to be held in an appropriately sized case or bag 19 as shown in FIG. 8. The kit of components includes the vessel 1, one or more storage bladders 9, a length of hose for connecting the vessel to a bladder and mechanism for inflating the cuffs of the vessel such as the gas bottle 11. Such kit can also include a battery or hand-operated pump for emergency inflation, as well as stakes, ropes or straps useful to position the vessel appropriately so as to confine and collect the leaking hazardous liquid.

We claim:

1. Mechanism for collecting liquid leaking from a land-based container comprising a containment vessel of flexible sheet material impervious to the leaking liquid, said vessel having an open end defining a mouth leading into the interior of the vessel and a normally closed end opposite said open end, a lip extending from said mouth for positioning adjacent to the container and configured such that the leaking liquid falls onto said lip, said lip having a marginal portion, and a cuff having a first part at least partially encircling said mouth and inflatable so as to maintain said mouth open for flow of the liquid therethrough from said lip into said vessel, and a second part being inflatable and extending adjacent the marginal portion of said lip for retaining any runoff of the leaking liquid.

2. The mechanism defined in claim 1, in which the cuff includes a generally U-shaped portion extending along the margin of the lip from generally opposite sides of the mouth, respectively, which generally U-shaped portion is inflatable to form a raised rim.

3. The mechanism defined in claim 1, including tie-downs spaced circumferentially around the open end portion of the vessel.

4. The mechanism defined in claim 1, in which the normally closed end of the vessel includes a valve for controlling discharge of liquid from such end of the vessel.

5. The mechanism defined in claim 4, including a collapsible collection container connectible to the normally closed end portion of the vessel for receiving liquid through the valve from the interior of the vessel.

6. The mechanism defined in claim 5, including a hose connectible between the normally closed end of the vessel and the collapsible collection container for conveying liquid from the vessel to the collection container.

7. The mechanism defined in claim 1, in which said first part of the inflatable cuff has a chamber defining an arcuate upper part of the cuff inflatable to generally upright condition for maintaining the upper portion of the mouth of the vessel open and said second part of said cuff includes a separately inflatable chamber defining a bottom part extending along the marginal portion of the lip and, upon inflation, forming a raised rim surrounding the central portion of the lip projecting from the mouth of the vessel.

8. The mechanism defined in claim 7, including means for inflating the cuff, said inflating means including means for supplying gas under pressure, valve means controlling the supply of gas from the gas-supplying means and directional valve means selectively manipulable to control the chamber(s) to which the gas is supplied.

9. The mechanism defined in claim 8, including means for regulating the maximum pressure of gas supplied into the cuff by the gas-supplying means.

10. A kit of components for collecting liquid leaking from a land-based container comprising: a containment vessel component of flexible sheet material impervious to the leaking liquid, said vessel having an open end defining a mouth leading into the interior of the vessel and a normally closed end opposite said open end, a lip extending from said mouth for positioning adjacent to the container and configured such that the leaking liquid falls onto said lip, a cuff having a first part at least partially encircling said mouth and inflatable so as to maintain said mouth open for flow of the liquid therethrough from said lip into said vessel and a second part extending adjacent the margin of said lip for retaining any runoff of the leaking liquid; a collapsible collection container component connectible to the normally closed end portion of the vessel for receiving liquid through the valve from the interior of the vessel, said components being foldable to a compact condition; means for inflating said cuff; and a storage container containing said components and said inflating means.

11. Mechanism for collecting liquid leaking from a container comprising:
 a containment vessel of flexible sheet material impervious to the leaking liquid;
 said vessel having an open end defining a mouth leading into the interior of the vessel and a normally closed openable end opposite to said open end;
 a lip extending from said mouth for positioning adjacent to the container and configured such that leaking liquid falls onto said lip, said lip having a marginal portion; and
 a cuff having a first part at least partially encircling said mouth and extending upwardly therefrom and being rigid so as to maintain said mouth open for flow of the liquid therethrough from said lip into said vessel, and a second part extending upward adjacent the marginal portion of said lip for retaining any runoff of the leaking liquid.

12. The mechanism defined in claim 11, in which the cuff includes a generally U-shaped portion extending along the margin of the lip from generally opposite sides of the mouth, and which is inflatable to form a raised rim.

13. The mechanism defined in claim 11, including tie-downs spaced circumferentially around the open end portion of the vessel.

14. The mechanism defined in claim 11, in which the normally closed end of the vessel includes a valve for controlling discharge of liquid from such end of the vessel.

15. The mechanism defined in claim 14, including a collapsible collection container connectible to the normally closed end portion of the vessel for receiving liquid through the valve from the interior of the vessel.

16. The mechanism defined in claim 15, including a hose connectible between the normally closed end of the vessel and the collapsible collection container for conveying liquid from the vessel to the collection container.

17. The mechanism defined in claim 11, in which said first part and said second part of said cuff are rigidified by being inflatable, and said first part of said inflatable cuff has a chamber defining an arcuate upper part of the cuff inflatable to generally upright condition for maintaining the upper portion of the mouth of the vessel open and said second part of said cuff includes a separately inflatable chamber defining a bottom part extending along the marginal portion of the lip and, upon inflation, forming a raised rim surrounding the central portion of the lip projecting from the mouth of the vessel.

18. The mechanism defined in claim 17, including means for inflating the cuff, said inflating means including means for supplying gas under pressure, valve means controlling the supply of gas from the gas-supplying means and directional valve means selectively manipulable to control the chamber(s) to which the gas is supplied.

19. The mechanism defined in claim 18, including means for regulating the maximum pressure of gas supplied into the cuff by the gas-supplying means.

20. A kit of components for collecting liquid leaking from a container comprising:
 a containment vessel component of flexible sheet material impervious to the leaking liquid, said vessel having an open end defining a mouth leading into the interior of the vessel and a normally closed openable end opposite said open end;
 a lip extending from said mouth for positioning adjacent to the container such that the leaking liquid falls onto said lip;
 a cuff having a first part at least partially encircling said mouth and rigidifiable so as to maintain said mouth open for flow of the liquid therethrough from said lip into said vessel, and a second part extending adjacent the margin of said lip for retaining any runoff of the leaking liquid;
 a collapsible collection container component connectible to the normally closed openable end portion of the vessel for receiving liquid through the normally closed openable end portion from the interior of the vessel;
 said components being foldable to a compact condition, means for rigidifying at least the first part of said cuff, and a storage container containing said components and said rigidifying means.

* * * * *